July 22, 1952  C. R. BROWN  2,603,945
JET ENGINE WITH AFTERBURNER
Filed June 14, 1949
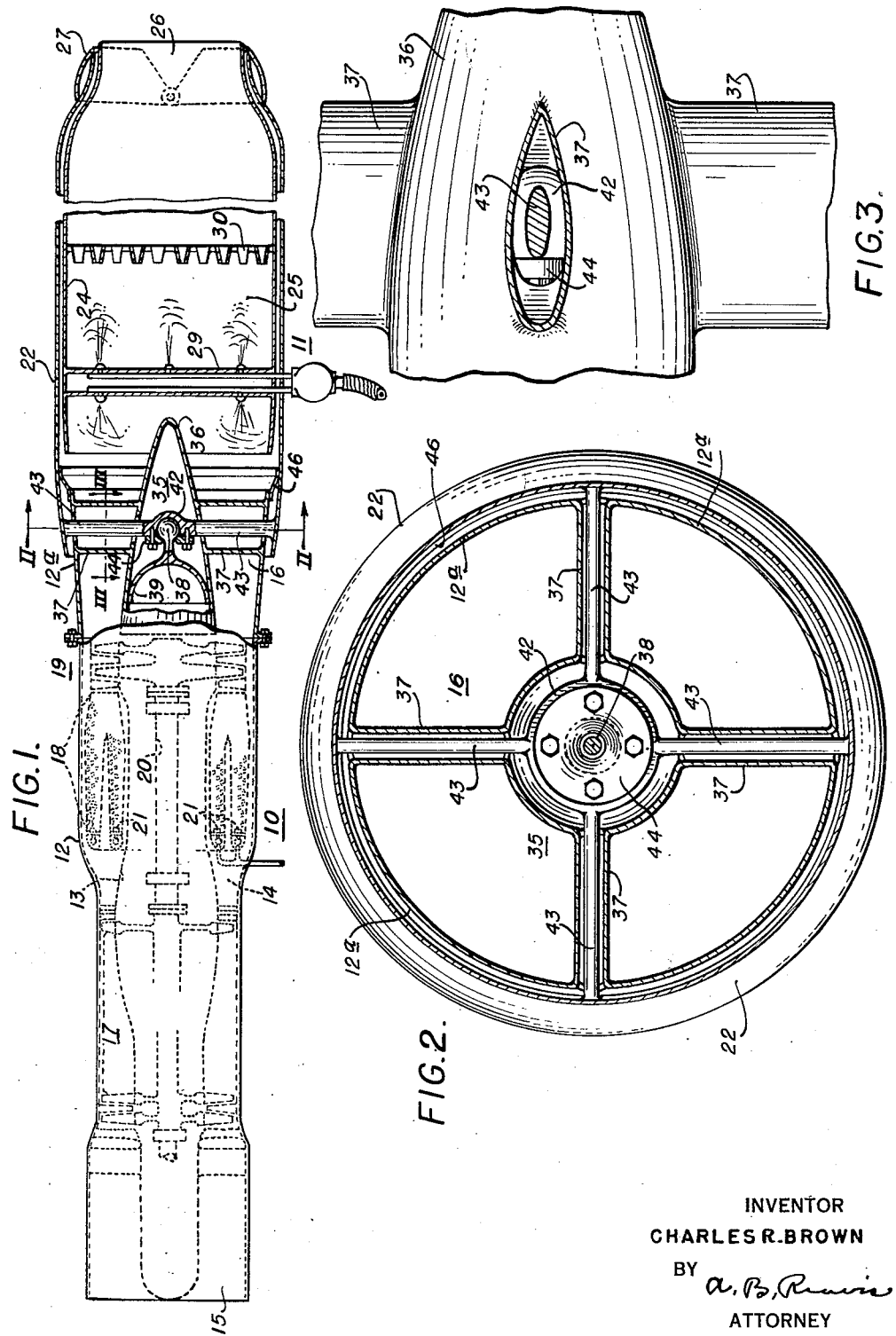
INVENTOR
CHARLES R. BROWN
BY
ATTORNEY Patented July 22, 1952

2,603,945

UNITED STATES PATENT OFFICE 2,603,945

JET ENGINE WITH AFTERBURNER

Charles R. Brown, Glen Mills, Pa., assignor, by mesne assignments, to the United States of America as represented by the Secretary of the Navy Application June 14, 1949, Serial No. 99,050

7 Claims. (Cl. 60—35.6)

This invention relates to aircraft power plants, and more particularly to jet apparatus equipped with an afterburner.

With the advent of larger and heavier jet propelled aircraft entailing the use of afterburner apparatus in association with each engine, designers have been confronted with the problem of providing proper support of the elongated envelope of each power plant without subjecting it to stresses due to flexure of the aircraft structure during flight operation. To meet this problem it has been proposed to provide independent support for the engine and the tailburner together with flexible coupling means permitting relative motion between the separate casing structures thereof. It is a principal object of the present invention to provide an improved jet and tailburner structure of this type having means affording the desired flexibility while ensuring adequate strength and effective distribution of structural and operational forces developed under service conditions.

A further object of the invention is the provision of an improved gas turbine power plant having a flexible casing structure adapted to meet the exacting weight and dimensional requirements for aircraft service.

These and other objects are effected by the invention as will be apparent from the following description and claims taken in connection with the accompanying drawing, forming a part of this application, in which:

Fig. 1 is a diagrammatic elevational view, partly in section, of a gas turbine power plant constructed in accordance with the invention;

Fig. 2 is an enlarged detail sectional view taken along the line II—II of Fig. 1; and Fig. 3 is a fragmentary enlarged detail view taken along the line III—III of Fig. 1.

The typical gas turbine power plant illustrated diagrammatically in Fig. 1 comprises a turbojet engine 10 and a tailburner apparatus 11, both of which have substantially cylindrical casing structures mounted in coaxial alignment and adapted to be independently supported in the fuselage or wing of an aircraft (not shown). The turbojet engine 10 includes an outer casing 12 and an inner core structure generally indicated at 13, which form an annular passageway 14 extending longitudinally through the engine from a forwardly-directed air intake opening 15 to a rearwardly-disposed turbine discharge passage 16. Operating elements of the turbojet engine are mounted in axial alignment to minimize frontal area, and include an axial-flow compressor 17, annular combustion apparatus 18, and a turbine 19, the rotor of which is operatively connected to the rotor of the compressor through the medium of a common shaft 20 that is suitably journaled within the core structure 13. In operation, air entering the intake opening 15 is compressed by the compressor 17 and delivered to the combustion apparatus 18, where fuel supplied by way of nozzles 21 is burned to form hot motive fluid, which is expanded through the turbine 19 for driving the compressor, and thence supplied through the discharge passage 16 to the afterburner apparatus 11.

The afterburner apparatus 11 comprises a generally cylindrical outer casing 22, the forward end of which is sufficiently large to overlap or telescope, in a spaced relation, a portion of the rearmost section 12a of the turbojet outer casing structure 12, as shown in Fig. 1. Mounted in the casing 22 is a tubular combustor or casing section 24, in which is formed an auxiliary combustion chamber 25, which communicates with the turbine discharge passage 16 and terminates in a discharge opening or nozzle 26, the flow area of which may be controlled by suitable movable tailpiece members 27. Auxiliary fuel nozzle apparatus 29 is mounted in the casing section 24 for supplying fuel to the combustion chamber 25. A suitable flame holder or apertured baffle 30 may also be mounted in the chamber 25 downstream of the nozzle apparatus 29. It will be understood that fuel supplied by way of the nozzle apparatus 29 is burned and the heated gas and air mixture exhausted from the turbojet unit 10 to provide additional energy which is expended in propelling the aircraft upon final discharge of the resultant motive fluid to atmosphere through the variable area nozzle 26.

According to the invention, the engine casing structure 12 and the afterburner casing 22 are flexibly coupled together through the medium of a ball joint assemblage 35 disposed centrally within the telescoping portions of the two casings. As shown in Fig. 1, a generally frusto-conical hollow core section 36 is supported along the axis of the engine casing structure 12 downstream of the turbine 19 by means of a plurality of radially disposed hollow struts 37, each of which is of airfoil form in cross-section (see Fig. 3) and is welded, or otherwise suitably secured, at its outer end to the casing section 12a. Mounted within the hollow core section 36 is a stationary ball joint member 38 having an enlarged annular mounting portion 39 which is welded to the inner surface of the core section, so that the ball joint member is anchored coaxially with respect to the casing structure 12 of the turbojet engine. For supporting the afterburner casing 22 on the ball joint member 38 there is provided a socket joint member 42 engaging the ball joint member and having a plurality of radially disposed arms 43, each of which extends through an aperture in the core section into one of the hollow struts 37. The outer ends of the arms 43 project beyond the casing section 12a and are welded, or otherwise secured, to the portion of the afterburner casing 22 which encompasses the engine casing section 12a. Suitable means such as a ring 44 and bolts may be secured to the socket joint member 42 for holding it in rocking engagement with the ball joint member 38.

It will be noted that the arms 43 are considerably smaller in cross-section than the respective hollow struts 37, so that sufficient space is provided therebetween to permit a limited misalignment or relative flexing movement of the assembled casing structures of the engine 10 and the afterburner 11 with respect to the common axis thereof. As best indicated in Fig. 2 of the drawing, limited torsional movement between the casing 22 carried on the arms 43 and the casing section 12a carried on the struts 37 is likewise facilitated due to the rotatable connection between the ball and socket joint members 38 and 42. With both the engine 10 and the afterburner 11 suitably mounted in an aircraft fuselage or wing, the flexible coupling assemblage 35 thus is adapted to permit sufficient yielding of the power plant casing assembly to prevent undue transmission of strain thereto from the aircraft structure.

In order to minimize leakage of gases in the region of the coupled casing structures 12 and 22, an annular flap seal or flange element 46 is preferably mounted on the rearmost marginal portion of the casing section 12a, as shown in Fig. 1 of the drawing. The flange element 46 has an outwardly flaring flexible skirt portion engageable with the inner surface of the afterburner casing 22. A similar sealing element (not shown) may, if desired, be provided adjacent the rear edge of the afterburner casing.

While I have shown my invention in but one form, it will be obvious to those skilled in the art that it is not so limited, but is susceptible of various changes and modifications without departing from the spirit thereof.

What I claim is:

1. In an aircraft power plant having an outer engine casing and a core structure axially mounted therein, coaxial afterburner apparatus therefor including an outer cylindrical casing structure having a forward end disposed in spaced overlapping relation with respect to the rear end of the first-named casing, and flexible supporting means for said afterburner apparatus including radial struts carried by said engine casing and a ball joint assembly centrally supported thereon, said ball joint assembly including radial members connected to said casing structure of the afterburner apparatus.

2. In a power plant for jet propulsion of aircraft comprising main combustion apparatus, a substantially cylindrical casing having an axially arranged core structure supported by a plurality of hollow struts radially disposed within the discharge passage of said main combustion apparatus, and an afterburner apparatus having a substantially cylindrical casing large enough to overlap a portion of the first-named casing, the combination therewith of yieldable coupling means comprising a stationary ball joint element mounted on said core structure, a socket joint element movably secured thereto and a plurality of radially-disposed members carried by said afterburner casing for supporting said socket joint element, each of said members extending through one of said hollow struts.

3. Apparatus as set forth in claim 2 wherein an annular flap seal element is interposed between the telescoped portions of the respective casings of the power plant and afterburner apparatus.

4. Apparatus as set forth in claim 2 wherein the hollow struts and the ball joint supporting members disposed therein are so proportioned as to facilitate limited torsional movement as well as angular flexure of the assembled casings centerline of the power plant and afterburner apparatus.

5. In an aircraft power plant having an outer engine casing and a core structure axially mounted therein, coaxial afterburner apparatus therefor including an outer cylindrical casing structure having a forward end disposed in spaced overlapping relation with respect to the rear end of the first named casing, and a flexible supporting means for said afterburner apparatus including radial struts having airfoil cross sections which struts are carried by said engine casing and a ball joint assembly centrally supported thereon, said ball joint assembly including means for securing the afterburner apparatus against bodily movement axially of the engine casing and also including radial members connected to the casing structure of the afterburner apparatus.

6. The combination of claim 5 further defined in that the said radial struts and members are approximately normal to the axis of the engine.

7. The combination of claim 6 further defined in that each of the radial members extend through a radial strut and that a limited lost motion is provided between the radial struts and the enclosed radial members.

CHARLES R. BROWN.

REFERENCES CITED

The following references are of record in the file of this patent:

UNITED STATES PATENTS

| Number | Name | Date |
|---|---|---|
| 979,513 | Koenig | Dec. 27, 1910 |
| 1,674,130 | Russell | June 19, 1928 |
| 2,095,728 | Bard | Oct. 12, 1937 |
| 2,396,568 | Goddard | Mar. 12, 1946 |
| 2,504,422 | Johnson | Apr. 18, 1950 |
| 2,516,910 | Redding | Aug. 1, 1950 |

FOREIGN PATENTS

| Number | Country | Date |
|---|---|---|
| 588,085 | Great Britain | May 14, 1947 |